Figure 1:
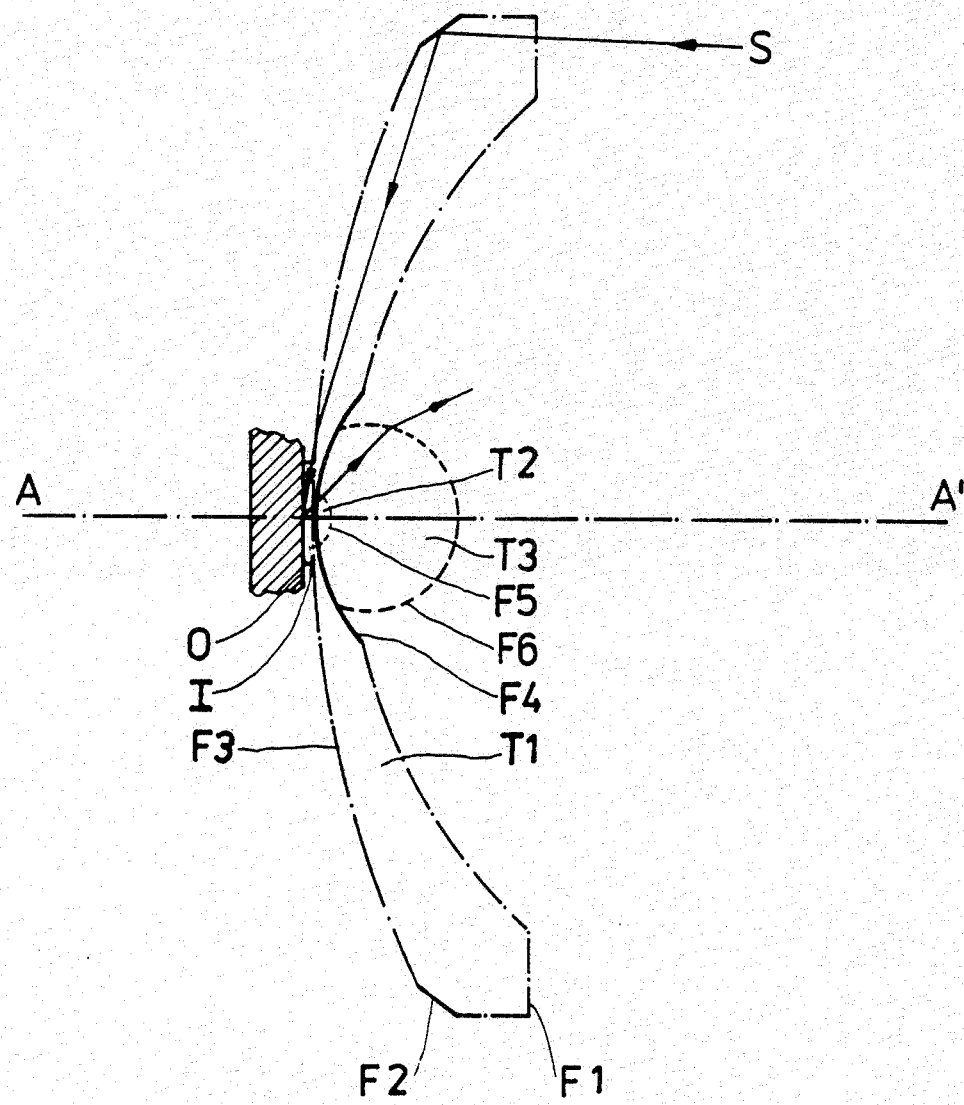

United States Patent [19]

Baumann

[11] Patent Number: 4,634,234

[45] Date of Patent: Jan. 6, 1987

[54] FRONT LENS GROUP FOR IMMERSION MICROSCOPE OBJECTIVE IN BD VERSIONS OF HIGH APERTURE

[75] Inventor: Hans-Georg Baumann, Jena, German Democratic Rep.

[73] Assignee: Jenoptik Jena G.m.b.H., Jena, German Democratic Rep.

[21] Appl. No.: 645,873

[22] Filed: Aug. 29, 1984

[51] Int. Cl.⁴ .............................................. G02B 21/10
[52] U.S. Cl. ...................................................... 350/414
[58] Field of Search ................................. 350/414, 525

[56] References Cited

U.S. PATENT DOCUMENTS 1,999,240  4/1935  Kraft et al. .......................... 350/525

FOREIGN PATENT DOCUMENTS 0218470  9/1968  U.S.S.R. ............................. 350/414

OTHER PUBLICATIONS

Boegehold, *Das Optische System des Mikroskops*, pp. 96–99, VEB Verlag Technik Berlin, 1959.

Primary Examiner—John K. Corbin
Assistant Examiner—Rebecca D. Gass
Attorney, Agent, or Firm—Jordan & Hamburg

[57] ABSTRACT

The invention relates to a front lens group for an immersion objective of BD arrangement with high aperture, suitable for a dark field incident illumination of a widefield immersion objective for microscopes. A spherical front lens surface is provided with a totally reflecting aspherical surface section via which the light is guided to the object, and is combined with a suitable epipolar system to produce a widefield immersion objective of even and colorfree illumination. The lens group is forwardly self-contained.

5 Claims, 1 Drawing Figure

FRONT LENS GROUP FOR IMMERSION MICROSCOPE OBJECTIVE IN BD VERSIONS OF HIGH APERTURE

The invention relates to dark field incident illumination of widefield immersion objectives of microscopes.

In a bright field/dark field microscope the ringshaped dark field incident illumination optics is fixedly connected as a unit with the imaging system. The bright field incident illumination usually occurs through the imaging system. The superimposition of the two lights is performed between the objective and the tube lens. Due to the self-contained design, a BD immersion objective of high numerical aperture is consequently possible. The present state of art is thus an opton-epi-planapochromat BD 100×/1.30 oil ∞/0 and an object field diameter of approximately 0.32 mm. The dark field incident illumination is performed by two optics sections separated from each other with only one being cemented to the front lens. All optically effective surfaces guide the light by refraction to the objective. This configuration has the following disadvantages:

Due to the strong dispersion at the glass and air surfaces of high refracting angles, there is a great wavelength dependency of the object illumination;

due to the high refracting angles, there are reflection losses at the glass and air surfaces;

the cementing layers between the front lenses are exposed to immersion and cleaning liquids;

the production of the front group is very expensive; its support has to be performed in a complicated fashion on the mounting of the imaging system.

The object of the invention is to provide a front lens group for a dark field incident illumination of high aperture, which fulfills the general requirements of a BD objective, and which in conjunction with a suitable imaging system results in a BD objective without the above-mentioned disadvantages, and which can be technically effectively realized.

The further object of the invention is to provide a front lens group for a dark field incident illumination configuration of microscope objectives forming a self-contained unit with the design of a widefield immersion objective, which is only minimally exposed to immersion and cleaning liquids, and which to a large extent avoids dispersion and reflection losses on glass and air surfaces.

In accordance with the invention, the solution of the problem of providing a front lens group for immersion microscope objectives in BD arrangement with high aperture, is the provision of a front group of a spherical surface bordering on the immersion is, which is utilized not only by the dark field incident illumination, but also by the path of image rays. In this way, the entire optical illumination system and imaging in the direction of the object is completely stably sealed. By utilizing a mirror surface as the main reflecting element, there results no dispersion of the illumination, and reflection angles of the mirror surface of all rays of the illumination ring are greater than the border angles of the total reflection of a glass and air surface of an average refractive index. Therefore, the mirror surface does not need to be covered, and in conjunction with small refracting angles on the surface of incidence of the light, guarantees a maximum intensity. By means of a suitable selection of the radius of the spherical surface adjacent to the objective, it can serve not only for the path of the illumination rays, but also for the first surface of the imaging system. This allows the provision without any further arrangements, of the swivel feature on the nosepiece. By utilization of a type of glass of a higher refraction index with respect to the immersion, the illumination aperture can be increased in the immersion. In this way a pure dark field incident illumination is provided without any bright field portions for the outer zones of the object plane. Concurrently the second surface of the front lens, which is cemented to the following lens of the imaging system, also contributes to the flattening of the image field, and the exit pupil shifts in the direction of the surface toward which the objective is displaced. For achieving a maximal concentration of the energy of illumination on the surface of the object having a diameter of 0.32 mm, the mirror surface can be suitably aspherically configured. As a result of the optical interaction of the curvatures of the surfaces of the front section of the objective, in conjunction with the conditions that the third radius of the front lens group is greater than concentric, and that the last radius of the front lens group is less than concentric to the path of image rays, the false light portion during bright field incident illumination can be minimized. This is not the case in conventional form of the front lens groups of immersion microscope objectives of high aperture.

An opaque object is illuminated by means of a dark field incident light ray path, whereby the almost parallel light is guided over an aspherical, totally reflecting glass and air surface of the front section of the objective, and which, after performing the immersion and reflection on the object via the lenses of the imaging system, is utilized for image formation.

The invention will now be more clearly explained with reference to FIG. 1 of the drawing which is a simplified cross sectional view of a front lens group in accordance with the invention.

The object O with the applied immersion liquid I is located on a point of the optical axis A—A'. The front lens group is immersed in the immersion I. The front lens group, in the direction of the image plane, consists of a front lens T1 which, in forward direction, is bordered by the surfaces F2 and F3, a biconvex lens T2, having a radius greater than concentric to the path of the image rays, and a convex/concave lens T3 of which the radius in direction A' on the optical axis is less than concentric to the path of the image rays. The lenses T1, T2 and T3 are cemented to each other on the surfaces F4 and F5. The surface F1 of the front lens T1 is directed transversely and perpendicularly to the optical axis A—A'. The surface F3 of the front lens T1, as well as the surface F4, are spherical. A ray S, originating from an almost parallel light bundle, enters through the surface F1 into the front lens T1, and is reflected by the aspherical surface F2 of the front lens T1 in the direction of the object O. After reflecting on the object O immerged in the immersion, the ray S enters through the front lens T1 and the lenses T2 and T3 of the imaging system, and contributes to the image formation.

In the preferred embodiment of the invention the parameters of the lenses are selected in accordance with Tables 1 and 2, and the refractive index of the front lens T1 is between 1.52 and 1.544.

TABLE 1

| Lens | Refractive Index | Center Thickness |
|---|---|---|
| T1 | 1.54 | 0.05 |
| T2 | 1.46 | 0.30 |

TABLE 1-continued

| | | |
|---|---|---|
| T3 | 1.73 | 4.40 |

| Surface | Radius |
|---|---|
| F1 | ∞ |
| F3 | 37 |
| F4 | 3.5 |
| F5 | 0.7 |
| F6 | 3.3 |

TABLE 2

| Coordinates of the aspherical surface F2 | |
|---|---|
| Height, resp. distance to optical axis | Arrow, resp. distance to object plane |
| 14.536 | 3.232 |
| 14.862 | 3.669 |
| 15.138 | 4.113 |
| 15.500 | 4.516 |
| 15.812 | 5.013 |
| 16.118 | 5.470 |
| 16.419 | 5.931 |
| 16.715 | 6.397 |
| 17.006 | 6.867 |

What is claimed is:

1. In a front lens group for an immersion microscope objective in BD arrangement with high aperture for dark field incident illumination, comprising a front lens (T1) having a spherical surface adapted to be immersed in the immersion, and an imaging system of first and second lenses (T2, T3), the lenses (T2, T3) of the imaging system having their surfaces of greatest curvature towards the image plane, the improvement wherein the surface of said front lens toward said immersion is continuous, the front lens having an annular rear surface in a plane normal to the axis for receiving light, and an aspherical front surface positioned for reflecting light in the direction of an object in said immersion from said annular surface.

2. In a front lens group for an immersion microscope objective in BD arrangement with high aperture for a dark field incident illumination, comprised of a front lens (T1) having a front surface (F3) bordering on the immersion, the front lens (T1) having a surface (F4) cemented to the front surface of an image forming system (T2, T3); the improvement wherein the surface (F3) of the front lens (T1) toward the immersion does not have a bore therethrough, and the front lens (F1) has a frontal glass-air surface (F2) which intersects the front surface (F1), the frontal surface (F2) being positioned for beam deflection of the dark field incident illumination.

3. The front lens group of claim 2 wherein the frontal glass-air surface (F2) is totally reflecting and is aspherical.

4. The front lens group of claim 2 wherein the image forming system comprises a front lens (T2) cemented to the surface (F4) and a rear lens (T3) cemented to the lens (T2), the radius of the cemented surface between the front lens (T2) and rear lens (T3) being greater than concentric with respect to the path of the image rays, and the radius of the rear lens (T3) away from the front lens (T2) being less than concentric.

5. The front lens group of claim 2 having parameters selected in accordance with the values in Tables 1 and 2 as follows:

TABLE 1

| Lens | Refractive Index | Center Thickness |
|---|---|---|
| T1 | 1.54 | 0.05 |
| T2 | 1.46 | 0.30 |
| T3 | 1.73 | 4.40 |

| Surface | Radius |
|---|---|
| F1 | ∞ |
| F3 | 37 |
| F4 | 3.5 |
| F5 | 0.7 |
| F6 | 3.3 |

TABLE 2

| Coordinates of the aspherical surface F2 | |
|---|---|
| Height, resp. distance to optical axis | Arrow, resp. distance to object plane |
| 14.536 | 3.232 |
| 14.862 | 3.669 |
| 15.138 | 4.113 |
| 15.500 | 4.516 |
| 15.812 | 5.013 |
| 16.118 | 5.470 |
| 16.419 | 5.931 |
| 16.715 | 6.397 |
| 17.006 | 6.867 |

* * * * *